United States Patent Office 3,383,702
Patented May 14, 1968

3,383,702
ALTERNATE PEN ACTUATING MECHANISM
Simeon J. Donahue, Cheshire, Conn., assignor to American Chain & Cable Company, Bridgeport, Conn., a corporation of New York
Filed Oct. 4, 1966, Ser. No. 584,219
17 Claims. (Cl. 346—140)

ABSTRACT OF THE DISCLOSURE

A multiple pen mechanism for a strip chart recorder in which the pens are pivotally movable about separate intersecting axes into alternate marking registry with the chart at a common position thereon. The pens are controlled by a lever which is carried by the sliding carriage of the recorder and is actuated by a solenoid to change the marking on the chart from one pen to the other.

---

This invention relates to recording instruments and more particularly to a marking system for such instruments for producing indicia on a record medium.

The present invention, while of general application, is particularly well suited for use in recording instruments of the type which include a paper strip chart driven across a cylindrical roller. Some of the wide variety of instruments with which the invention advantageously may be employed are disclosed in Product Data Bulletin No. P1210.1-2, issued March 1958 by the Bristol Company, Waterbury, Conn., and in Clinton A. Blakeslee U.S. Patents 2,628,149 and 3,189,910. Instruments of this type customarily and provided with a sliding carriage which is linearly movable across the recording surface of the chart in accordance with a particular input variable. A capillary pen or other marking element is mounted on the carriage to produce a continuous record of the variable on the chart.

For many recording instruments of the foregoing class, it often is desirable to provide a plurality of marking elements which are alternately movable into engagement with the chart. As an illustration, should the pen of the instrument become broken or exhaust its ink supply, the availability of a succeeding pen enables the continuation of the record being made without interruption. As another illustration, it frequently is advantageous to produce the record of a given variable in more than one color, as in cases in which ink of a given color is used to record the variable below a particular alarm point and ink of another color is used to record the variable above the alarm point, and this may be readily accomplished by the use of a plurality of pens having different ink supplies. A change in the color of the record also may be used to denote a switching from one chart scale to another, thus denoting different ranges on the scale, and for many other purposes.

Heretofore, difficulties were encountered in the provision of recording instruments having multiple pens or other marking elements arranged for alternate engagement with a paper chart. For example, the line which is produced on the chart advantageously should be continuous and in registry irrespective of the particular pen that is used and prior recording instruments often have proved deficient in this respect. In addition, in instruments previously employed it frequently was difficult to provide sufficient flexibility in the point at which the marking elements were changed, and these latter difficulties were of special moment in instruments of the type in which the change from one element to another took place only when the carriage of the instrument was located at a preselected position along the face of the chart. Furthermore, many prior recording instruments of the dual pen type were restricted to the use of only two such pens and also exhibited difficulties in the maintenance of a uniform stylus pressure on the chart.

One general object of the invention, therefore, is to provide a new and improved recording instrument having a plurality of marking elements for producing indicia on a chart or other record medium.

More specifically, it is an object of this invention to provide such instrument in which the marking elements may be readily moved into alternate marking registry with the record medium without interruption or deviation in the record being made.

Another object of this invention is to provide an instrument of the character indicated in which the change from one marking element to another may be performed at substantially any desired point in the recording cycle.

A further object of this invention is to provide a multiple pen mechanism for a strip chart recorder in which each of the pens is arranged to engage the chart with a uniform stylus pressure.

Still another object of this invention is to provide a multiple pen recording instrument utilizing comparatively simple mechanical and electromechanical components which is economical to manufacture and thoroughly reliable in operation.

In one illustrative embodiment of this invention, the recording instrument includes a plurality of capillary pens or other marking elements which are supported on a linearly movable carriage. The marking elements are independently connected to the carriage in a unique manner for movement into alternate marking registry with the record medium of the instrument. Upon the actuation of a novel control mechanism for the elements, the marking on the record medium is automatically changed from one element to another.

In accordance with one feature of the invention, the marking elements are arranged for independent pivotal movement with respect to the carriage about separate axes. The arrangement is such that the marking elements are movable into alternate marking registry with the record medium at a common position thereon, thereby avoiding any discontinuity or change in registry of the record being made.

In accordance with another feature of the invention, in certain particularly advantageous embodiments, the change from one marking element to another is accomplished by a unique lever mechanism in response to the energization of a solenoid. The solenoid may be located at any desired position on the instrument and may be controlled either manually or automatically in response to particular input signals, carriage positions, etc., to change from one marking element to another at substantially any point in the recording cycle.

In accordance with a further feature of the invention, in several good arrangements, each of the marking elements is supported by a separate pivot ball carried by an angularly disposed bracket. The pivotal axes of the balls extend at acute angles with respect to the line of movement of the carriage and are arranged such that two, three or even four marking elements may be employed without affecting their registry on the chart.

In accordance with a still further feature of some embodiments of the invention, the lever mechanism for changing from one marking element to another is effective to urge one of the elements away from the chart while simultaneously permitting another element to drop by gravity into marking registry therewith. With this arrangement, the pressure of the active element on the chart at all times is determined by gravitational force to provide a uniform stylus pressure.

The present invention as well as further objects and features thereof will be understood more clearly and fully from the following description of certain preferred embodiments, when read in conjunction with the accompanying drawings, in which:

Figure 1:
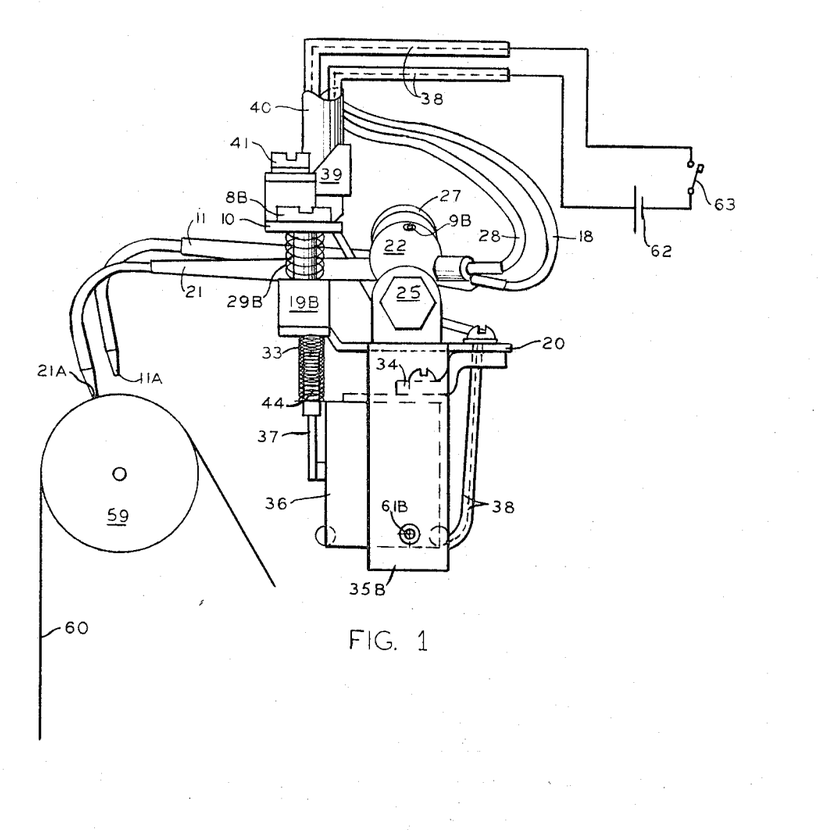
FIGURE 1 is a side elevational view of a dual pen inking system in accordance with one illustrative embodiment of the invention, together with a schematic representation of appropriate electrical circuitry associated therewith.
Figure 2:
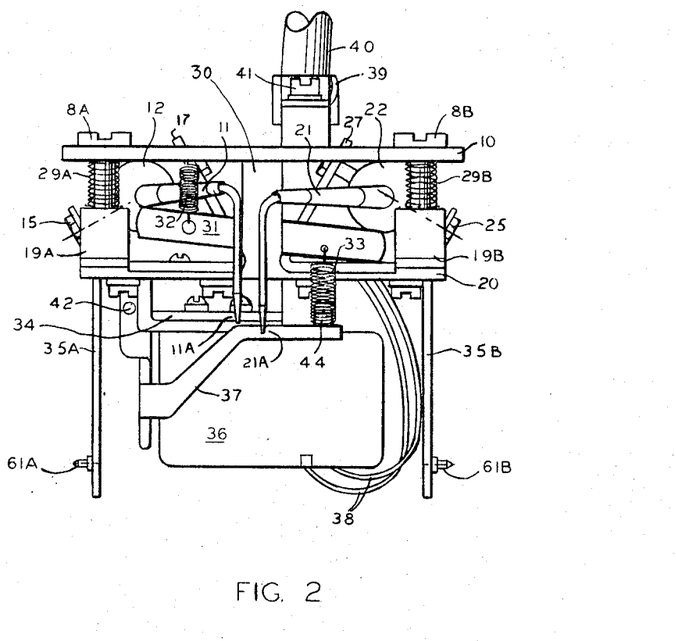
FIGURE 2 is a front elevational view of the inking system shown in FIGURE 1, with certain parts omitted for purposes of clarity.

Referring to FIGURES 1 and 2 of the drawings, there is shown a dual pen mechanism for a recording instrument which includes a carriage bracket indicated generally at 20. The bracket 20 forms a part of the slidable pen carriage of the instrument and includes two depending side plates 35A and 35B which are respectively provided with pivot pins 61A and 61B. As will be understood, the pins 61A and 61B enable the positioning of the bracket 20 in fixed but removable relationship with the remaining portion of the carriage (not shown in FIGURES 1 and 2). The carriage is linearly movable across the face of the instrument in response to changes in the value of the variable being recorded.

Figures 3A, 3B, 3C:
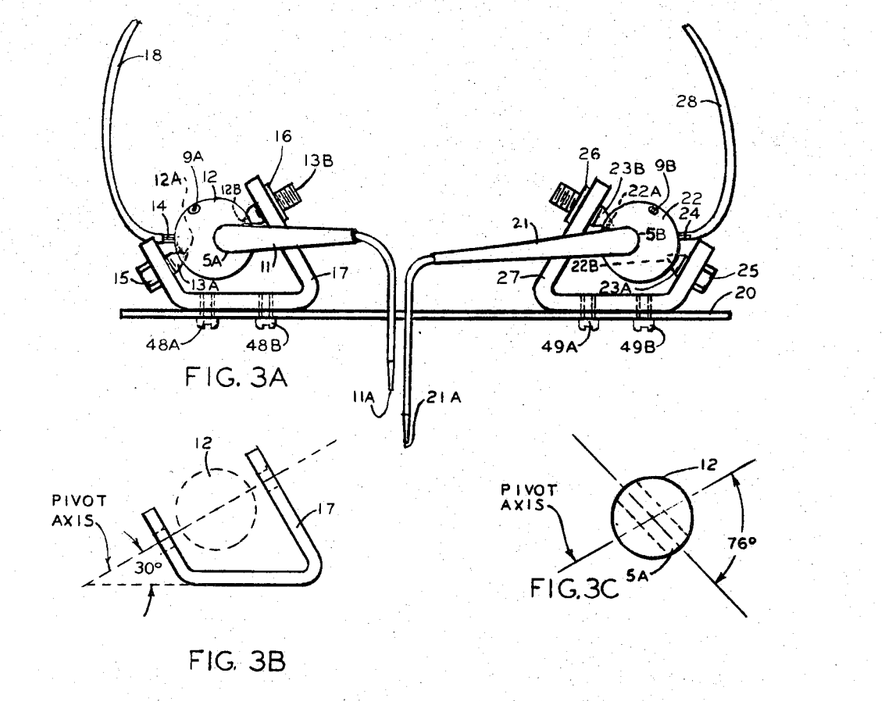
FIGURE 3A is a front elevational view similar to FIGURE 2 but with further parts omitted to expose additional structure.
FIGURES 3B and 3C are detail views respectively showing two of the parts illustrated in FIGURE 3A.

As best shown in FIGURE 3A, the carriage bracket 20 supports two generally U-shaped brackets 17 and 27. The bracket 17 is rigidly but adjustably held on the upper surface of the bracket 20 by two screws 48A and 48B which are disposed in corresponding slots in the bracket 20, while the bracket 27 is similarly held on the bracket 20 by two screws 49A and 49B. The brackets 17 and 27 are spaced apart on the bracket 20 in the direction of movement of the carriage and are bent outwardly such that their upwardly extending arms are disposed at acute angles with respect thereto. The arms of the bracket 17 are provided with axially aligned threaded apertures which accommodate two pointed screws 13A and 13B, while similar apertures in the arms of the bracket 27 accommodate two pointed screws 23A and 23B. The screws 13A and 23A include heads 15 and 25, while the screws 13B and 23B are provided with lock nuts 16 and 26 to hold the screws in their properly adjusted positions.

Two pivot balls 12 and 22 are respectively interposed between the arms of the brackets 17 and 27. The balls 12 and 22 include apertures 12A, 22A and 12B, 22B into which the corresponding pointed screws 13A, 13B, 23A and 23B extend to support the balls for independent pivotal movement with respect to the carriage about separate intersecting axes. Each of these axes intersect the direction of movement of the carriage at an acute angle. Thus, referring to FIGURE 3B, the ball 12 is movable about a pivot axis which meets the direction of movement of the carriage bracket 20 at an inwardly extending acute angle which illustratively is of the order of thirty degrees. The pivot axis for the ball 22 meets the direction of movement of the carriage bracket at an equal but opposite acute angle. The axes for the respective balls intersect above the approximate midpoint of the carriage.

Drilled through the center of the pivot ball 12 is a diametrical aperture 5A into which is placed the tubular metal barrel of a capillary pen 11. The pen 11 is held in position by a socket set screw 9A and includes a small extension 14 on the rearward end of the barrel which accommodates capillary tubing 18 leading to a suitable ink supply (not shown in FIGURE 3A). The forward portion of the pen 11 extends horizontally at an angle with respect to the direction of movement of the carriage bracket 20 and then downwardly in a substantially vertical direction, where its lower end terminates in an outlet orifice 11A. In a similar manner, the pivot ball 22 includes a diametrical aperture 5B having the barrel of a capillary pen 21 therein. The pen 21 is affixed to the ball 22 by a socket set screw 9B and its rearward extension 24 is connected to capillary tubing 28. The pen 21 extends forwardly from the ball 22 at an angle with respect to the direction of movement of the carriage and then downwardly in a direction parallel to the corresponding portion of the pen 11. The lower end of the pen 22 includes an outlet orifice 21A.

The outlet orifice 11A and 21A for the capillary pens 11 and 21 are supported in close juxtaposition with a chart roller 59 (FIGURE 1) and a strip chart 60 thereon. As best shown in FIGURE 3C, the diametrical aperture 5A for the pen 11 intersects the pivot axis of the ball 12 at a comparatively large angle which advantageously is less than ninety degrees and in the illustrated embodiment is of the order of seventy-six degrees. The diametrical aperture 5B for the pen 21 is similarly oriented with respect to the pivot axis of the ball 12. The pens 11 and 21 are independently movable about the respective pivot axes into alternate marking registry with the strip chart 60 at a common position thereon. The arrangement of the pivot axes at acute angles with respect to the direction of movement of the carriage, together with the offset intersecting angles of the pen apertures 5A and 5B enables either pen to swing about its axis into contact with the chart 60 by coming down at a side angle to the common position. Simultaneously, the other pen elevates at a side angle away from the chart. With this arrangement, the possibility of interference taking place as the pens change positions is eliminated.

The control mechanism for enabling movement of the pens 11 and 21 into alternate marking registry with the strip chart 60 is supported by two cylindrical posts 19A and 19B (FIGURE 2). The posts 19A and 19B protrude upwardly from opposite sides of the forward portion of the carriage bracket 20 and are internally threaded to accommodate mounting screws 8A and 8B. These screws are inserted only partway into their respective posts and are provided with coil springs 29A and 29B. The springs 29A and 29B resiliently support a horizontal top plate 10 for the control mechanism which extends between the screws 8A and 8B in spaced, parallel relationship with the main body portion of the bracket 20.

Depending from the forward central portion of the top plate 10 is an extension 30. A lever arm 31 is pivotally connected intermediate its ends to the extension 30 and is resiliently biased in a clockwise direction, as viewed in FIGURE 2, by a coil spring 32. The spring 32 is connected between the plate 10 and the left-hand side of the arm 31, and is effective to urge the left end of the arm into engagement with the tubular barrel of the pen 11, thereby holding the pen away from the chart 60. The right-hand side of the arm 31 is disposed a short distance beneath the tubular barrel of the pen 21 and is connected to one end of a coil spring 33. The opposite end of the spring 33 is connected to the outer end of an actuator arm 37 and is prevented from substantial movement with respect thereto by an upstanding pin 44. The arm 37 is pivotally connected, as at 42, to a support bracket 34 which is rigidly affixed to the carriage bracket 20.

The actuator arm 37 forms a portion of the armature for a solenoid 36. This solenoid is supported by the bracket 34 and includes a pair of lead-in wires 38. As best shown in FIGURE 1, the wires 38 extend upwardly from the solenoid 36 through a cable 40 which is held in place on the top plate 10 by a bracket 39 and a set screw 41. The cable 40 leads to a remote portion of the instrument where the wires 38 are supplied with power from a suitable current source 62 (which may be DC or AC) and are connected in series with a normally open switch 63.

The switch 63 may be operated either manually or automatically in response to the position of the carriage, the value of the input variable, or upon the receipt of some other input signal indicating the desirability of changing from one of the recording pens to the other. With the various components in the positions shown in FIGURES 1 and 2, the biasing spring 32 acts on the lever arm 31 to hold the pen 11 away from the chart 60, while the pen 21 is held by gravity in marking registry therewith. Upon the closing of the switch 63, current is supplied along the conductors 38 to energize the solenoid 36 and swing the outer end of the actuator arm 37 in a counterclockwise direction, as viewed in FIGURE 2, about the pivot 42. The arm 37 acts through the resilient connection provided by the coil spring 33 to pivot the lever arm 31 in a similar direction, as viewed in this figure, against the biasing force provided by the spring 32. During its pivotal movement, the right hand portion of the arm 31 engages the barrel of the capillary pen 21 to move the pen 21 upwardly away from the strip chart 60 (FIGURE 1). Simultaneously, the left hand portion of the arm 31 in contact with the barrel of the capillary pen 11 moves in a downward direction to permit the pen 11 to drop by gravity into marking registry with the chart 60. As a result of the angular orientation of the pivot axes for the pens 11 and 21 with respect to the line of movement of the carriage, and hence with respect to the chart 60, the pen 11 also moves in a lateral direction away from the vertical center line between the pens, while the pen 21 moves laterally toward the center line. With this arrangement, the position at which the pen outlet 11A contacts the chart is the same as the position previously held by the pen outlet 21A.

The switch 63 is returned to its open position at the time it is desired to change from the capillary pen 11 to the capillary pen 21. Upon the opening of the switch, the solenoid 36 is de-energized to pivot the outer end of the actuator arm 37 in a downward direction about the pin 42. The biasing spring 32 thereupon returns the lever arm 31 to its initial position (the position shown in FIGURE 2), and the pen 21 drops by gravity into marking registry with the chart 60 while the pen 11 is simultaneously urged by the lever arm away from the chart. The arrangement is such that the pens 11 and 21 are alternately movable into marking registry with the chart at a common position thereon in response to the energization and de-energization of the solenoid 36, with the result that a continuous, unbroken line is produced on the chart irrespective of the particular pen being employed.

By mounting the capillary pens 11 and 21 for independent pivotal movement about separate pivot axes, the recorder may be provided with even further pens or other marking elements in addition to the pens 11 and 21 shown in the drawings. The additional pens are supported on the carriage bracket 20 by suitable pivot balls and angle brackets arranged externally with respect to the angle brackets 17 and 27. The angles for the pivot axes of the additional pens are equal and opposite to one another but are somewhat greater than the angles for the pens 11 and 21 to permit all of the pens to be moved in succession into marking registry with the chart at a single common position thereon.

As indicated heretofore, the lever arm 31 is carried by the extension 30 of the top plate 10, and this plate in turn is connected to the carriage bracket 20 by the coil springs 29A and 29B. In addition, the coil spring 33 is interposed between the arm 31 and the actuator 37. The arm 31 is thus resiliently supported with respect to the carriage such that any small misalignment of the various parts during the assembly of the mechanism is compensated for by the coil springs. The spring 33, which acts primarily as a motion transmitting device between the actuator 37 and the arm 31, enables a smooth transmission of force from the actuator to the arm.

Figure 4:
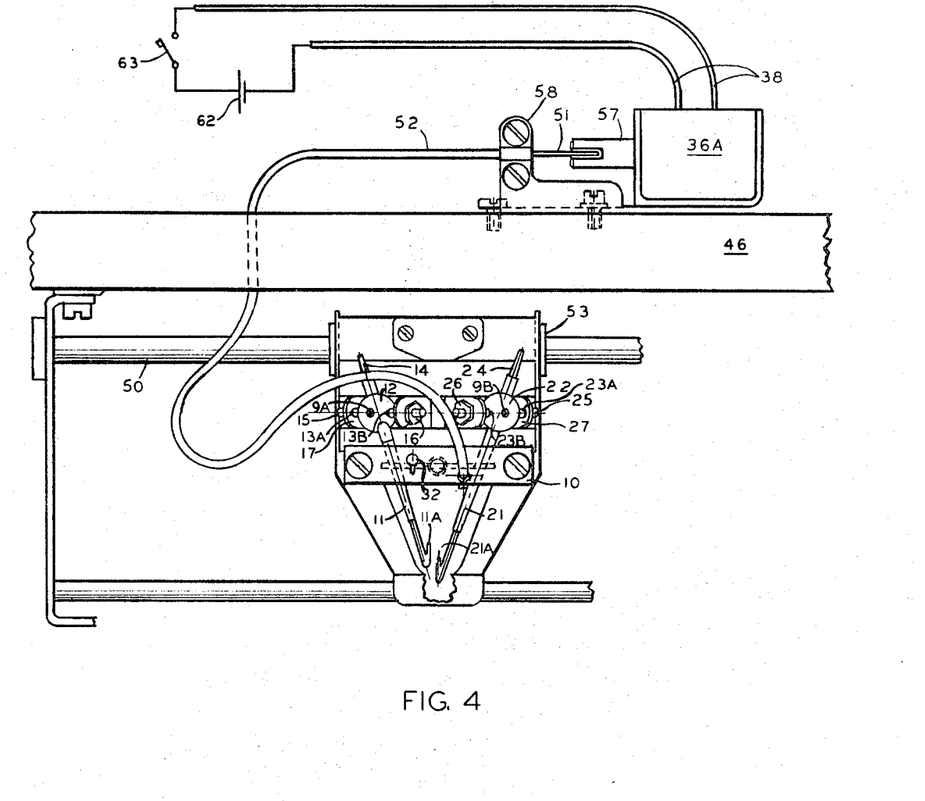
FIGURE 4 is a top plan view of a portion of a recording instrument including a dual pen inking system in accordance with another illustrative embodiment of the invention, with certain parts shown broken away and with a schematic representation of appropriate electrical circuitry associated therewith.
Figure 5:
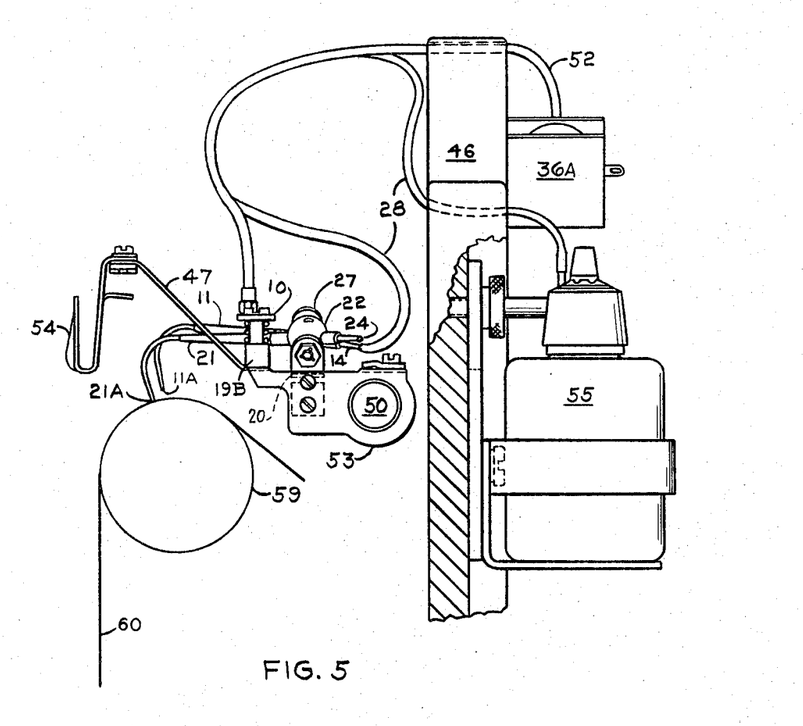
FIGURE 5 is a side elevational view of the portion of the instrument shown in FIGURE 4, with certain parts broken away and in section and with other parts added.
Figure 6:
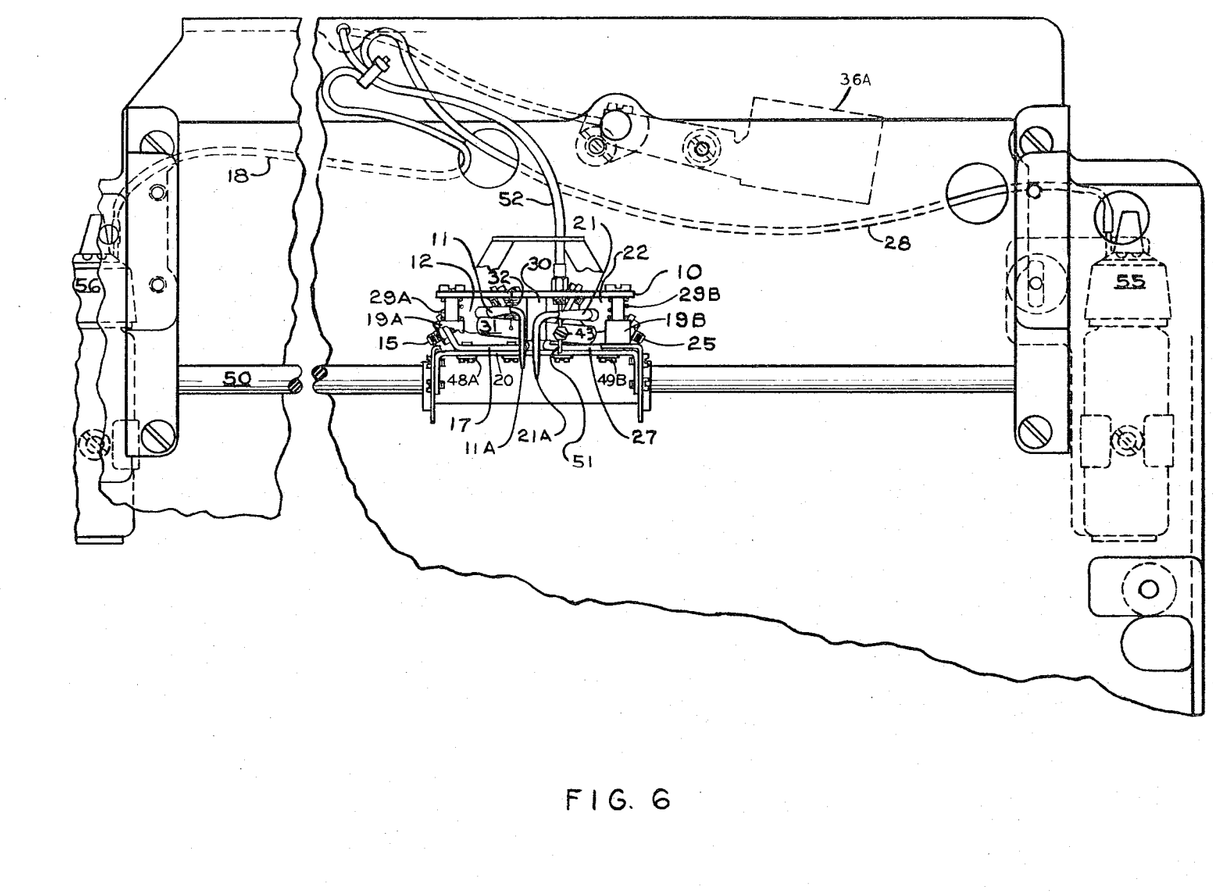
FIGURE 6 is a front elevational view of the portion of the instrument shown in FIGURE 4, with certain parts added and other omitted for purposes of clarity.

Referring now to FIGURES 4, 5 and 6, there is shown a multiple pen mechanism for a strip chart recorder in accordance with another illustrative embodiment of the invention. The recorder includes a cylindrical guide bar 50 which supports a pen carriage 53 for linear sliding movement across the recording surface of the strip chart 60 (FIGURE 5). The capillary pens 11 and 21 are mounted on the carriage 53 in a manner which is generally similar to that described above. However, the carriage bracket 20, rather than being removably affixed to the remaining portion of the carriage through the use of the pins 61A and 61B (FIGURE 2), is permanently secured thereto through the use of suitable attaching screws.

The recording instrument of FIGURES 4-6 includes a stationary panel 46 which extends vertically on the side of the carriage 53 opposite that adjacent the chart roller 59. The panel 46 supports two ink bottles 55 and 56 (FIGURE 6) at opposite ends thereof. The bottles 55 and 56 are respectively connected by the capillary tubing 18 and 28 to the supply extensions 14 and 24 for the pens 11 and 21. The recorder also may be provided with a pointer 54 (FIGURE 5) which is connected to the carriage 53 by an extension bracket 47 and cooperates with a scale (not shown) to provide a visual indication of the value of the variable being recorded on the continuously moving chart 60.

The panel 46 also carries a solenoid 36A which is remotely located with respect to the pen carriage 53. As best shown in FIGURE 4, the solenoid 36A includes an armature 57 which is connected to one end of a flexible cable 51. This rod is slidably disposed in a flexible sheath 52 and is connected at its opposite end to the right-hand portion of the lever arm 31, as viewed in FIGURE 6, where it is rigidly secured thereto by a screw 43.

Upon the energization of the solenoid 36A in response to the closing of the switch 63, the armature 57 moves to the right, as viewed in FIGURE 4, to draw the cable 51 within the sheath 52 in a direction to pivot the lever arm 31 against the resilient bias of the coil spring 32. This pivotal movement raises the capillary pen 21 off the chart 60 and permits the capillary pen 11 to drop by gravity into marking registry therewith in the manner described heretofore. During the movement of the pens 11 and 21, the pen 21 is angularly directed away from the vertical center line between the pens, while the pen 11 is directed toward this line. The pen outlets 11A and 21A are thus arranged to contact the chart at a common position thereon to avoid any change in registry during the switching from one pen to the other.

The terms and expressions which have been employed are used as terms of description and not of limitation, and there is no intention in the use of such terms and expressions, of excluding any equivalents of the features shown or described of portions thereof, it being recognized that various modifications are possible within the scope of the invention claimed.

What is claimed is:

1. In an instrument for producing indicia on the recording surface of a record medium, in combination, a plurality of marking elements, support means for maintaining said marking elements in juxtaposition with said record medium, means connecting said marking elements to said support means for independent pivotal movement with respect thereto about separate intersecting axes, each of said axes being angularly disposed with respect to the recording surface of said record medium, control means carried by said support means for enabling movement of said marking elements about their respective axes into alternate marking registry with said recording surface at a common position thereon, and means for actuating said control means to change the marking on said recording surface from one of said marking elements to the other.

2. In an instrument of the character set forth in claim 1, said support means comprising carriage means linearly movable across the recording surface of said record medium, each of the pivotal axes for said marking elements intersecting the line of movement of said carriage means at an acute angle.

3. In an instrument of the character set forth in claim 2, said acute angles being equal and opposite to one another.

4. In a recording instrument for producing indicia on a record medium, in combination, a plurality of marking elements, carriage means for maintaining said marking elements in juxtaposition with said record medium, means connecting said marking elements to said carriage means for independent pivotal movement with respect thereto about separate axes, each of said axes being angularly disposed with respect to the recording surface of said record medium, control means mounted on said carriage means for enabling movement of said marking elements about their respective axes into alternate marking registry with said record medium at a common position thereon, and means including an electrically operable solenoid for actuating said control means to change the marking on said record medium from one of said marking elements to the other.

5. In a recording instrument of the character set forth in claim 4, said solenoid being remotely located with respect to said carriage means.

6. In a recording instrument for producing indicia on a record medium, in combination, a plurality of marking elements, support means for maintaining said marking elements in juxtaposition with said record medium, means connecting said marking elements to said support means for independent pivotal movement with respect thereto about separate axes, lever means including a lever carried by said support means for enabling movement of said marking elements about their respective axes into alternate marking registry with said record medium at a common position thereon, said lever engaging one of said marking elements to hold the same away from said record medium while permitting another marking element to be held by gravity in marking registry therewith, and means for actuating said lever to disengage said one marking element, thereby permitting said one element to drop by gravity onto said record medium, and to engage the other marking element and lift said other element away from said record medium, to change the marking on said record medium from said other marking element to said one marking element.

7. In a recording instrument for producing indicia on the recording surface of a record medium, in combination, a plurality of marking elements, carriage means movable across the record medium of the instrument for maintaining said marking elements in juxtaposition with said record medium, means connecting said marking elements to said carriage means for pivotal movement with respect thereto about separate axes, each of said axes being angularly disposed with respect to the recording surface of said record medium, lever means pivotally supported by said carriage means in position to engage said marking elements for enabling movement of said marking elements about their respective axes into alternate marking registry with said record medium at a common position thereon, said lever means engaging one of said marking elements to hold the same away from said record medium while permitting another marking element to be held by gravity in marking registry therewith, and means for actuating said lever means to disengage said one marking element, thereby permitting said one element to drop by gravity onto said record medium, and to engage the other marking element and lift said other element away from said record medium, to change the marking on said record medium from said other marking element to said one marking element.

8. In a recording instrument for producing indicia on a record medium, in combination, a pair of marking elements, carriage means movable across the record medium of said instrument for maintaining said marking elements in juxtaposition therewith, connecting means for mounting said marking elements on said carriage means for independent pivotal movement relative to each other about separate axes, lever means including a lever pivotally supported by said carriage means in position to engage said marking elements for enabling movement of said elements into alternate marking registry with said record medium at a common position thereon, means for biasing said lever to hold one of said marking elements away from said record medium while permitting the other marking element to be held by gravity in marking registry therewith, and means for moving said lever against said biasing means, to permit said one marking element to drop by gravity into marking registry with said record medium at said common position and to simultaneously urge said other marking element away from said record medium.

9. In an instrument of the character set forth in claim 8, in combination, means for resiliently connecting said lever means to said carriage means.

10. A multiple pen mechanism for a recording instrument having a continuously movable chart, in combination, a plurality of marking pens, carriage means linearly movable across the chart of said instrument for maintaining said marking pens in juxtaposition therewith, connecting means for mounting said marking pens on said carriage means for independent pivotal movement relative to each other about separate axes, said axes meeting the line of movement of said carriage means at equal but opposite acute angles, control means supported by said carriage for enabling movement of said marking pens into alternate marking registry with said chart at a common position thereon, and means for actuating said control means to change the marking on said chart from one of said pens to the other.

11. A multiple pen mechanism for a strip chart recorder, in combination, a plurality of marking pens, carriage means linearly movable across the strip chart of said recorder for maintaining said marking pens in juxtaposition with said chart, connecting means including a plurality of pivot balls for mounting said marking pens on said carriage means for independent pivotal movement relative to each other about separate axes, one of said pivot balls being provided for each of said marking pens, each of said pivot balls being supported for movement about a pivotal axis which meets the line of movement of said carriage means at an acute angle, control means supported by said carriage for enabling movement of said marking pens into alternate marking registry with said strip chart at a common position thereon, and means for actuating said control means to change the marking on said chart from one of said pens to the other.

12. A multiple pen mechanism for a strip chart recorder, in combination, a pair of capillary marking pens, carriage means linearly movable across the strip chart of said recorder for maintaining said marking pens in juxtaposition with said chart, connecting means including a plurality of support brackets and pivot balls carried by said brackets for mounting said marking pens on said carriage means for independent pivotal movement relative to each other about separate axes, one of said support brackets and one of said pivot balls being provided for each of said marking pens, each of said pivot balls being supported for movement about a pivotal axis which meets the line of movement of said carriage means at an acute angle, lever means supported by said carriage means in position to engage said marking pens for enabling movement of said pens into alternate marking registry with said strip chart at a common position thereon, and means for actuating said lever means to change the marking on said chart from one of said pens to the other.

13. A multiple pen mechanism of the character set forth in claim 12, the actuating means for said lever means including an electrically operable solenoid, and switch means connected to said solenoid for energizing the same.

14. A multiple pen mechanism for a strip chart recorder, in combination, a pair of capillary marking pens having tubular barrel portions thereon, carriage means linearly movable across the strip chart of said recorder for maintaining said marking pens in juxtaposition with said chart, connecting means including a plurality of pivot balls for mounting said marking pens on said carriage means for independent pivotal movement relative to each other about separate axes, one of said pivot balls being provided for each of said marking pens, each of said pivot balls including an aperture therethrough and being supported for movement about a pivotal axis which intersects said aperture and meets the line of movement of said carriage means at an acute angle, the apertures for said pivot balls respectively accommodating the barrel portions of said marking pens, lever means supported by said carriage means in position to engage said marking pens for enabling movement of said pens into alternate marking registry with said strip chart at a common position thereon, and means for actuating said lever means to change the marking on said chart from one of said pens to the other.

15. A multiple pen mechanism of the character set forth in claim 14, each of said marking pens being held by gravity against said strip chart during the time it is in marking registry therewith.

16. A multiple pen mechanism for a strip chart recorder, in combination, a pair of capillary marking pens having barrel portions thereon, carriage means linearly movable across the strip chart of said recorder for maintaining said marking pens in juxtaposition with said chart, connecting means including a plurality of support brackets and pivot balls carried by said brackets for mounting said marking pens on said carriage means for independent pivotal movement relative to each other about separate axes, one of said support brackets and one of said pivot balls being provided for each of said marking pens, each of said pivot balls including an aperture therethrough and being supported for movement about a pivotal axis which intersects said aperture and meets the line of movement of said carriage means at an acute angle, the apertures for said pivot balls respectively accommodating the barrel portions of said marking pens and the acute angles for the pivotal axes of said balls being equal and opposite to each other, lever means pivotally supported by said carriage means in position to engage said marking pens for enabling movement of said pens into alternate marking registry with said strip chart at a common position thereon, means for biasing said lever means to hold one of said marking pens away from said chart while permitting the other pen to be held by gravity in marking registry therewith, and means including a solenoid for moving said lever means against said biasing means, to thereby permit said one pen to drop by gravity into marking registry with said chart at said common position, and to simultaneously urge said other pen away from said chart.

17. A multiple pen mechanism of the character set forth in claim 16, said solenoid being remotely located with respect to said carriage means.

References Cited

UNITED STATES PATENTS

| | | | |
|---|---|---|---|
| 299,011 | 5/1884 | Redding | 346—50 X |
| 938,516 | 11/1909 | Russell | 346—50 X |
| 1,754,503 | 4/1930 | Dwelle | 346—46 X |
| 2,445,272 | 7/1948 | Keegan | 346—49 |
| 2,724,631 | 11/1955 | Ruhland | 346—140 X |
| 3,108,844 | 10/1963 | Alexander et al. | 346—46 |
| 3,205,701 | 9/1965 | Szonntogh | 346—46 X |

RICHARD B. WILKINSON, *Primary Examiner.*

J. W. HARTARY, *Assistant Examiner.*